United States Patent
Scotney

(10) Patent No.: US 10,594,721 B1
(45) Date of Patent: Mar. 17, 2020

(54) PROXY COMPUTER SYSTEM TO PROVIDE SELECTIVE DECRYPTION

(71) Applicant: StratoKey Pty Ltd., Hobart, Tasmania (AU)

(72) Inventor: Anthony Scotney, Hobart (AU)

(73) Assignee: StratoKey Pty Ltd. (AU)

( * ) Notice: Subject to any disclaimer, the term of this patent is extended or adjusted under 35 U.S.C. 154(b) by 119 days.

(21) Appl. No.: 15/808,690

(22) Filed: Nov. 9, 2017

Related U.S. Application Data

(60) Provisional application No. 62/419,960, filed on Nov. 9, 2016.

(51) Int. Cl.
*G06F 11/00* (2006.01)
*H04L 29/06* (2006.01)

(52) U.S. Cl.
CPC ...... *H04L 63/1433* (2013.01); *H04L 63/0281* (2013.01); *H04L 63/0428* (2013.01)

(58) Field of Classification Search
CPC ............. H04L 63/1433; H04L 63/0428; H04L 63/0281

USPC ......................................................... 726/25
See application file for complete search history.

(56) References Cited

U.S. PATENT DOCUMENTS

| | | |
|---|---|---|
| 2004/0024826 A1 | 2/2004 | Halahmi |
| 2010/0071052 A1 | 3/2010 | Mao |
| 2014/0095865 A1 | 4/2014 | Yerra |
| 2015/0039887 A1* | 2/2015 | Kahol ................. G06F 21/6227 713/165 |
| 2016/0261668 A1 | 9/2016 | Joel |
| 2016/0269371 A1* | 9/2016 | Coimbatore ........ H04L 63/0471 |

\* cited by examiner

*Primary Examiner* — Mohammad W Reza
(74) *Attorney, Agent, or Firm* — Mahamedi IP Law LLP

(57) ABSTRACT

A proxy computer system receives content intended for a client computer from a third-party network service, where the content includes an encrypted portion. The proxy computer system makes a determination as to whether the encrypted portion is to be decrypted for the client computer, where the determination is made based at least in part on a historical analysis of the client computer. The proxy computer system sends the content to the client computer in a form that is based on the determination.

20 Claims, 6 Drawing Sheets

PROXY COMPUTER SYSTEM TO PROVIDE SELECTIVE DECRYPTION

RELATED APPLICATIONS

This application Claims benefit of priority to Provisional U.S. Patent Application No. 62/419,960, filed on Nov. 9, 2016; the aforementioned priority application being incorporated by reference in its entirety for all purposes.

BACKGROUND

Cloud, SaaS and web applications are increasingly adopted by enterprises. Using hosted services can expose security issues due to the fact that these services typically store information (often confidential) outside the corporate firewall. This shift towards cloud, SaaS and web applications has forced enterprise to search for mechanisms to independently secure these systems. In securing these systems, enterprises are using Suffix Proxy servers. The major constraint with suffix proxy servers is that as remote infrastructure changes location and subdomains, additional SSL certificates are required. For complicated cloud, SaaS and web applications the number of certificates or certificate subject alternative names can be extensive. In addition, SSL certificate infrastructure only allows a single level of wildcard certificate. This means that secure communications can be impossible without a certificate for every possible combination of URL subdomains. Complex geographically distributed applications make extensive use of subdomains for traffic routing, load balancing and redundancy. To effectively suffix these services, some conventional approaches require that an enterprise must know in advance every possible subdomain and have a certificate or entry within the certificate for every possible combination.

DETAILED DESCRIPTION

Figure 1:
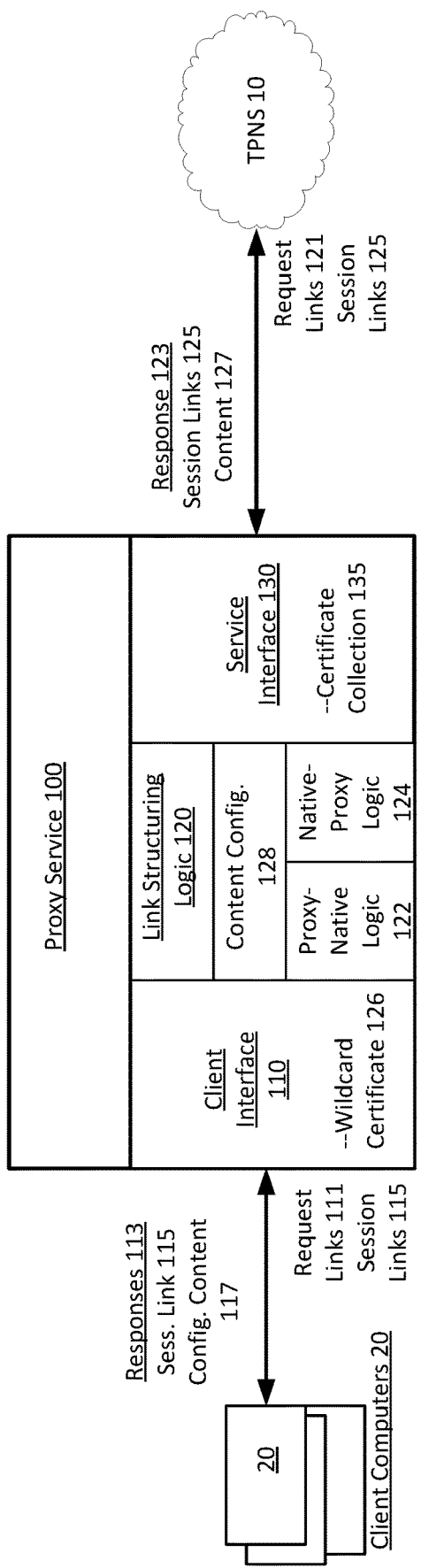
FIG. 1 illustrates an example proxy computer system, according to one or more embodiments.

Examples provide a proxy server system for use with clients that utilize network services. The proxy server system enables, for example, enterprise networks to utilize enhanced or ancillary services of the proxy server system in connection with the third-party network services. Through operation of the proxy server system, the number of distinct digital certificates which third-party network services typically required by clients is significantly reduced. Moreover, the proxy server system enables the client to receive the services of the third-party network service, without requiring configuration on the client through, for example, execution of scripts.

In some examples, a proxy server system operates to parse, structure and re-structure Uniform Resource Locators (URLs) which are provided from or for use with the third-party service. Among other functionality, the proxy server system replaces and constructs syntax for the URLs in a manner that reformats the individual URLs to have a common network level or wildcard designation. The proxy server system may perform translation operations so that clients utilize re-structured (or packed) links, while the third-party network service receives and generates de-structured or non-structured (or unpacked) links. The translation operations performed by the proxy server system may be transparent to both the client and to the third-party network service.

In some examples, the proxy server system encodes a destination of the third-party network service into an incoming request link from a client. The proxy server system 100 may also reconstruct the incoming request link to have the native structure of the third-party network service before sending the re-structured link to the third-party service. For links which are provided from the third-party network service, the proxy server system can structure the individual links from the native structure to an alternative structure of the proxy server system. In the alternative structure, the URL eliminates syntax that designates subdomains and multiple network levels, so that the URL is flattened and can accommodate a common wildcard designation. The proxy server system can also perform the translations for links provided by the third-party network service, so that a requesting client is able to receive the functionality provided through the provided links and accompanying data, without the client needing multiple SSL certificates which may otherwise be required from the third-party network service.

According to some examples, a proxy computer system uses at least a proxy-specified certificate, to receive one or more request links from the client, the one or more request links having a proxy domain format. The proxy computer system translates the one or more request links from the proxy domain format into a native structure for the third-party network service. The proxy computer system further communicates with the third-party network service using (i) the translated one or more request links, and (ii) multiple certificates that are required from the third-party network service to receive a particular data set.

According to some examples, a proxy computer system receives content intended for a client computer from a third-party network service, where the content includes an encrypted portion. The proxy computer system makes a determination as to whether the encrypted portion is to be decrypted for the client computer, where the determination is made based at least in part on a historical analysis of the client computer. The proxy computer system sends the content to the client computer in a form that is based on the determination.

In variations, a proxy computer system makes a determination as to whether a link, provided with content retrieved from a third-party network service, locates a corresponding resource that is of a preselected set of one or more types. If the corresponding resource located by the link is of the preselected type, the system structures the link as a direct link that is selectable by the requesting client computer to bypass the proxy service and to directly retrieve the corresponding resource from the third-party network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, servers, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

FIG. 1 illustrates a computer system for implementing a proxy service, according to one or more embodiments. In an example of FIG. 1, a proxy server system 100 may be implemented using a server, or combination of servers, to receive and forward communications between a group of client computers 20 ("client 20" or "clients 20") and a third-party network service 10 ("TPNS 10"). Each of the clients 20 may correspond to, for example, an end user terminal, server or other computer system capable of communicating with the proxy server system 100 over the World Wide Web and/or other data networks. Among other functionality, the proxy server system 100 can include or otherwise provide enhanced proxy service functionality, such as a traffic monitoring component, an encryption component, a security rule and policy enforcement component, and content configuration components. The TPNS 10 may correspond to, for example, a cloud service, such as a SaaS or cloud service. An example of FIG. 1 recognizes that, cloud and SaaS services typically require multiple levels of subdomains when processing client transactions and providing access to their respective services. For example, an "Example" service may utilize an "example" domain and further structure their respective URLs to specify subdomains (e.g., "system.na1.example.com"). As described with other examples, the third-party network service may require a separate server certificate for enabling access to data sets originating from each subdomain identified in the URL.

With respect to an example of FIG. 1, TPNS 10 may generate links for use in connection with its service, where the links have a native structure that specify multiple levels of subdomain. The multiple levels of subdomains may depend on factors such as geographical location and resource requested. By way of example, a typical link generated from TPNS 10 may correspond to "system.na1.example.com" wherein the "na1" signifies a set of server infrastructure—in this case North America 1. To further the example, TPNS 10 may also utilize "system.na2.example.com" which may signify a second set of server infrastructure.

The proxy server system 100 may structure the links for clients 20 in a manner that lessens the need for the client to maintain and utilize SSL certificates for multiple levels of subdomains. For example, a proxy domain format link provided from the proxy server system 100 may correspond to: "systern.na1.example.com.proxy-server.com".

The aforementioned link includes two levels ("system" and "na1") that may be dynamic. To support the use of dynamic multi-level links in the proxy server system 100, multiple certificates may be needed, to avoid problems such as certificate warnings and non-renderable portions of a page.

Among other benefits, some examples provide that no end-point configuration is needed for clients 20 which use utilize the proxy server system 100. Still further, in some examples, the proxy server system 100 may be implemented to function with established standards for exchanging communications on IP networks and the Internet. The proxy server system 100 can generate and provide request links 111 for the clients 20 to utilize in order to access TPNS 10. The request links 111 may be structured in a proxy domain format. For example, the individual links 111 may include a suffix domain character set that identifies the proxy server system 100, as well as TPNS 10. By way of example, a request link 111 can correspond to "www.example.com.proxy-server.com".

In providing a proxy service, the proxy server system 100 may structure request links 111 for use by individual clients. During a session, a given client 20 may initiate a session with the TPNS 10 using one or more request links 111. During the session, the TPNS 10 may provide responses 113, which include embedded links 115. The proxy server system 100 may receive and handle request links 111 from the client computer 20. The proxy server system 100 may receive incoming request links 111 from the client computer 20 in a proxy domain format, where the link (e.g., URL) is packed with replacement characters that signify subdomain characters. In a given session, the request links 111 which the client 20 selects, or has available for selection, re-structured (or packed) links, including re-structured initial request links 111 and session links 115 (e.g., links provided to user in response to output from TPNS 10, such as links embedded in content or responses of TPNS 10). Some or all of the re-structured request links 111 and session links 115 can include syntax for enabling a common wildcard designation, such that the proxy server system 100 can exchange communications with the client 20 using a single or common wildcard SSL certificate 126.

According to some examples, the proxy server system 100 includes a client interface 110, a link structuring logic 120, and a service interface 130. Initially, the client interface 110 can provide for the exchange of proxy communications with individual clients 20 in order to provide proxy services for the proxy server system 100. In particular, the client interface 110 may send and receive re-structured or packed request links 111 (as well as session links 115) that can be activated by the end user browser 20 (e.g., via a browser) to access a given resource of TPNS 10, through the proxy service 100. The client interface 110 may receive and send request and session links 111, 115 that have a proxy domain structure. For example, an incoming request link 111 that is received by the proxy server system 100 from one of the clients 20 may correspond to a Uniform Resource Locator ("URL") that includes syntax elements which specify a domain of the proxy server system 100.

In the proxy domain format, the individual request links 111 which are received from or sent to the client 20 may be formatted to include a character or character set that serves as an alternative marker of a subdomain delineation. However, the character or character set are selected to not be recognizable as a subdomain marker to, for example, the browser of the client 20, and the link may be re-structured so that the browser can use a single wildcard certificate when sending or receiving the link. In one implementation, the request links 111, when in the proxy domain format, include syntax elements which identify the proxy server system 100, as well as TPNS 10. Additionally, in the proxy domain format, some examples include syntax markers ("-" or (hyphen)) that are intended to map to character(s) ("." or (dot)) that are recognized by TPNS 10 to be delineators for subdomains of the network space provided by TPNS 10.

The proxy server system 100 may implement the link structuring logic 120 to translate incoming request links 111 and follow on session links 115 from the proxy domain structure to the native structure. In this process, each incoming request link 111 is translated into a corresponding request link 121 having the native structure. In one implementation, the link structuring logic 120 includes proxy-to-native logic 122 which for incoming request and session links 111, 115, (i) parses the individual links for syntax elements that are specific to the proxy service and its domain, and (ii) converts the individual request and session links 111, 115 from the proxy domain structure to the native structure (e.g., unpacks the URLs to eliminate the syntax of the proxy server domain, replaces the markers for subdomains with characters that signify subdomain, etc.).

The proxy-to-native logic 122 removes syntax from any request link 111 that is received by the proxy server system 100. In this way, request links 111 which are handled through the proxy server system 100 can be sent as request links 121 in the native structure to TPNS 10, so that the request link 111 is received and viewed by TPNS 10 without manipulation. Thus, for example, the logic 122 may generate the request link 121 for the TPNS 10, by parsing an incoming request link 111, removing a word-type syntax element that represents the proxy domain, and replacing a character marker of the incoming request link with a designated character that signifies a subdomain to the TPNS 10. For example, the incoming link 111 may correspond to "www.proxyservice.newconnpany-na1.com" and the link 121 provided for the TPNS 10 may correspond to "www.newconnpany.na1.com".

Absent use of the link structuring logic 120, if any individual level of the domain changes in the response from TPNS 10, the proxy server system 100 cannot securely communicate with the client 20 without additional server certificates being provided to the client. As described in greater detail, the proxy server system 100 may utilize link structuring logic 120 to enable exchanges with the client computers 20 to be conducted using a single server certificate 126 (e.g., wildcard SSL certificate). Specifically, the link structuring logic 120 structures individual links containing multiple levels of subdomains to reflect a common wildcard designation that has one level.

The service interface 130 can include processes to send re-structured request links 121 and session links 125 in the native structure, as well as to receive generated links 123 in the native structure as part of communication exchanges with TPNS 10. In some examples, the service interface 130 may operate like a browser of a client. In communicating with TPNS 10, the service interface 130 may access and use any one of a collection of SSL certificates 135, generated by or for use with TPNS 10. As described by other examples, TPNS 10 may utilize subdomains which separately require a specific SSL certificate from the requesting browser component (e.g., the service interface 130). In an example of FIG. 1, the service interface 130 may store and utilize the required SSL certificates 135 in order to receive all, or substantially all of the data sets in a given response from TPNS 10.

In one implementation, the service interface 130 can send re-structured request links 121 (and session links), having the native structure, to TPNS 10. Initially, the re-structured request links 121 are processed by TPNS 10 to generate one or more responses. The responses 123 from TPNS 10 can include content 127 with, for example, embedded session links 125 that have the native structure. In response to sending a given request link 121, the service interface 130 can assimilate the data sets generated by the response of TPNS 10. In some examples, the link structuring logic 120 may implement a content configuration component 128 which configures the data sets assimilated from the response(s) of TPNS 10 (e.g., content layout) into configured content 117 which the terminal interface 110 sends to requesting the client computer 20. The configured content 117 may have a proxy-specified format and/or structure. The configured content 117 may also embed session links 115 having the proxy server structure, and corresponding to the embedded session links 125 provided in the native structured content 127 outputted by the TPNS 10.

The content configuration component 128 may parse content within, for example, a resource or page assimilated by the service interface 130 from the response of TPNS 10, in order to identify links returned from TPNS 10. The native-to-proxy logic 124 may restructure each link (e.g., URL) from the native structure to the proxy domain format. Among other benefits, the link structuring logic 120 can operate so that all resources (e.g., data sets) delivered to the client 20 include links which, when selected, cause the client to navigate to the proxy server system 100.

The link structuring logic 120 may also implement the native-to-proxy logic 124 to convert links provided in the response of TPNS 10 from the native structure to the proxy domain structure. As described for some examples, the native-to-proxy logic 124 can parse, for example, embedded links 125 in the content 127 of the response from the TPNS 10, to detect syntax elements ("." or (dot)) which signify a subdomain of the network space used by TPNS 10. The native-to-proxy logic 124 may replace the ("." or (dot)) with alternative syntax (e.g., "-" or (hyphen)). This substitution provides a marker representation of the subdomain, but the syntax itself may not invoke subdomain meaning to the browser of the client 20.

In response to communicating a given request link 111, the proxy server system 100 may return, via the client interface 110, the response 113 in the proxy-specified structure. In some instances, the response 113 may include, for example, the configured content 117 which correspond to data sets originating from different subdomains of the network space used by TPNS 10. The response 113 may include embedded session links 115, which are restructured into the proxy domain structure to eliminate syntax which the client 20 would recognize as being a subdomain delineation. Thus, for example, the response 113 may include embedded links which may replace "." (dot) with "-" (hyphen) so as to create a link (e.g., URL) which is interpretable by standard browsers (e.g., such as used by the client 20) to include a common wildcard designation. In this way, the session links 115 returned with the responses 113 for a given response 123 may be structured to reduce the subdomain components to a single subdomain level, which can then be communicated to the browser of the client 20 using the wildcard SSL certificate 126, rather than multiple SSL certificates which would otherwise be required from the client 20. In this way, the client 20 does not need configuration beyond a standard configuration. Moreover, the user of the client 20 may select individual links returned in the response 113 which are in the proxy domain format, thus triggering the communication to pass through the proxy server system 100 again, rather than resulting in navigation outside of the domain of the proxy server system 100.

In the interaction between the client 20 and TPNS 10, the proxy server system 100 can be seamlessly integrated to structure the links used by the client 20 to eliminate, or at least mitigate against the need for multiple SSL certificates by the client 20, in order to process resources identified by the links returned from TPNS 10. Rather, the links may be structured to include syntax that specifies a common subdomain level, meaning a common wildcard designation may be made for each subdomain specified by the link or target resource.

By way of an example, the proxy server system 100 may provide a request link generated from or for TPNS 10 in a native format as: "system.na1.example.com". In order to redirect the use of the link through the proxy server system 100, the link may be structured as "system.na1.example.com.proxy-server.com". Under an example of FIG. 1, the proxy server system 100 may further structure the link so that the client 20 requires either a single specific certificate, or a wildcard certificate which is only available for a single subdomain level. The link structuring logic 120 of system 100 can structure the above URL into the following: "system-na1-example-com.proxy-server.com". Thus, the character designations for subdomains, as provided from TPNS 10, may be replaced by an alternative character ("-"). With this translation, the client 20 can process and use the link with a single wildcard certificate for *.proxy-server.com. With the structuring of the URL, the proxy server system 100 can support any level of subdomains using a single wildcard certificate.

Examples recognize that links may include parametric information, such as provided with URL search queries. In some examples, the parametric information can be detected and maintained. For example, a search string on the end of a link which is initially generated in the proxy domain format may correspond to: system-na1-example-com.proxy-server.com/search_string?query_string. The system parses these individual levels out of the URL.

In some examples, the link structuring logic 120 may structure the individual links so that the subdomain portion of the link is moved to the search string portion of the URL: "proxy-server.com/system-na1-example-com/search_string?query_string" can be translated to or from "system.na1.example.com/search_string?query_string". Any such combination can be made to ensure that the subdomains are recognized by the proxy server system 100 without requiring additional SSL certificates.

The proxy server system 100 can structure request links 121 from TPNS 10 by moving the portion of the request link which correlates to the subdomain(s), and then translating the request links to replace the character designations for subdomains. The translation of the request links 121 may be conducted in real-time, to ensure that the content (including the embedded links) from TPNS 10 can be served to individual client devices using a single certificate (including wildcard). With a single or wildcard certificate, the client may require zero end-point configuration.

Thus, for example, the proxy server system 100 may perform a parsing and translation process at the server level without the use of scripts (e.g., browser executable code) on the client side. The resources which are provided by the response from TPNS 10 can be parsed to identify links which are then restructured to utilize the proxy domain format. The restructuring ensures that all communications from the client device are sent to the location of the proxy server system 100 and not to the original destination.

Methodology

Figure 2:
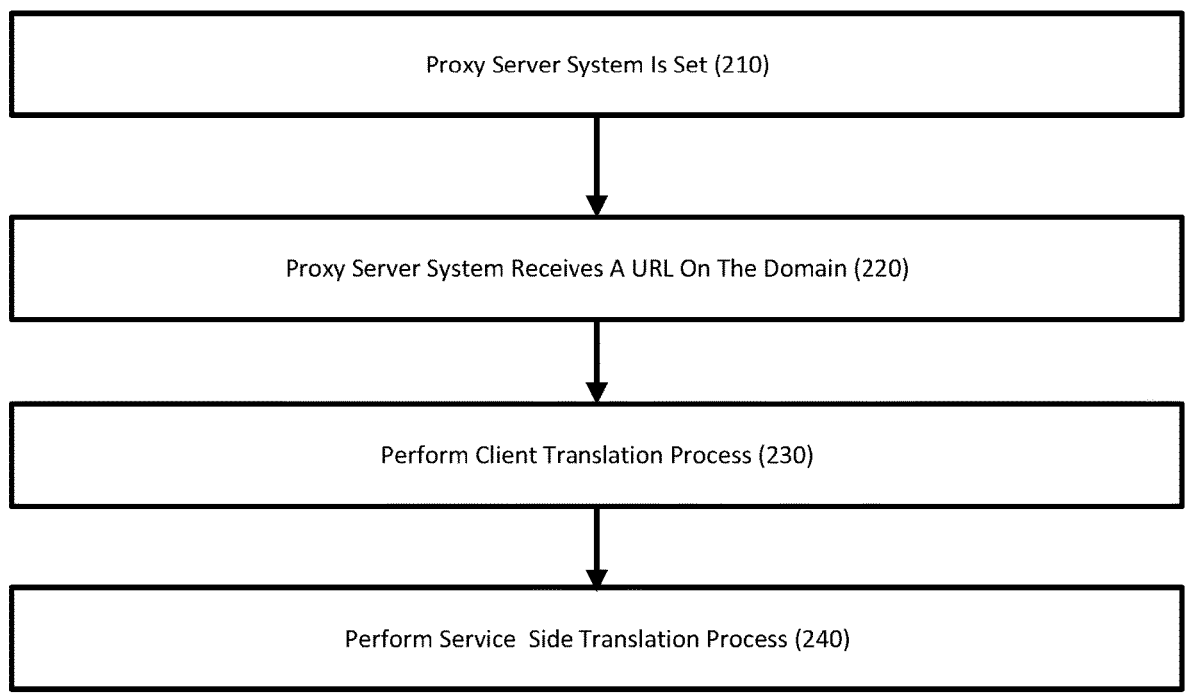
FIG. 2 illustrates an example method for operating a proxy service to enable client computers (including servers) to utilize a third-party network service.

FIG. 2 illustrates a method for operating a proxy server, according to one or more embodiments. A method such as described with an example of FIG. 2 may be implemented using a proxy server system such as described with an example of FIG. 1. Accordingly, reference is made to elements of FIG. 1 for purpose of illustrating suitable components for performing a step or sub-step.

In one implementation, the proxy server system 100 is set to operate in a suffix mode and provided with the domain used as the suffix (210). The proxy server system 100 may further be deployed in a network environment where multiple clients are able to use, for example, browsers to access the proxy server system 100. The clients 20 may access the proxy server system 100 in order to receive services from TPNS 10.

When a given client seeks to access TPNS 10, the proxy server system 100 may receive a URL on the domain (220). The proxy server system 100 receives the URL and removes a domain component from the URL. The proxy server system 100 may also pack the URL to include alternative syntax, for example, "-" for syntax that designates subdomains ".", so that the URL is structured to include a single subdomain. This can be performed by the proxy server system 100 at the proxy level by parsing the URL and matching the URL into a suffix proxy format.

When a client 20 communicates back to the proxy server system 100, the client translation process is performed (230). This may include following a URL, a subdomain portion of the URL is unpacked, and a syntax conversion is performed to replace the alternative syntax of the packed URL (e.g., '-' (hyphen)) back into a '.' (dot), which is a standard domain separator within a URL. Conversely, then the response is provided by the TPNS 10, the service side translation process may be performed to structure or pack URLs, as described with examples above (240).

Through the structuring of the URLs exchanged between the client 20, the proxy server system 100 and TPNS 10, the proxy server system 100 can enable a single SSL certificate or wildcard SSL certificate to be employed for the client. In this way, the clients are able to receive the enhanced functionality and benefits of the proxy server system 100, without requiring endpoint configuration which is typical under conventional approaches.

In the case where the original URL contains a '-' or other structuring character, a host-mapping filter or similar solution can be used. The host-mapping filter can be selected to specify an original domain so that it is not unpacked to identify a subdomain. For example, "sub-domain.example-.com" may be unpacked to "sub-domain.example.com" rather than "sub.domain.example.com".

The proxy server system 100 may be implemented as an intermediary between one or more clients 20 and TPNS 10. TPNS 10 may correspond to, for example, a cloud service, a SaaS or a web-based application or service.

Each network request sent by the client 20 through the proxy server system 100 may be examined. If any suffix domain is detected, the proxy server system 100 can initiate performance of the link structuring process, as described with an example of FIG. 1.

Likewise, a network request that is sent from the client 20 to the proxy server system 100 may have the suffix removed when processed by the proxy server system 100. Furthermore, the proxy server system 100 may unpack the URL into its original or native format. This process may also be performed in real-time.

A network response that is sent from the proxy server system 100 to the client 20 may include the suffix applied, and the original URL packed so as to remove syntax that marks subdomains. The proxy server system 100 may perform this operation in real-time, so that the original content of the response does not need to have addresses rewritten in files or scripts, or be modified.

The proxy server system 100 may implement processes to ensure that the content of the resource when packed is "unpacked"/reformatted back to how it was originally presented by TPNS 10, SaaS or web application so as to not break compatibility with said end application.

The Example cloud application may be being used by an organization. The domain in use to access services may be system.na1.salesforce.com Here, "system" and "na1" are subdomains; "salesforce" is the root domain; and "com" is the TLD.

SSL certificates issued to Salesforce by a recognized certificate authority allow the organization to access this site securely in a browser.

The organization uses a proxy computer system to route traffic through a domain under their control. (e.g., stratokey.com). A full suffix domain may then appear as system.na1.salesforce.com.stratokey.com Here, "system", "na1", "salesforce" and the first "com" are all subdomains; "stratokey" is the root domain; the last "com" is the TLD.

In this situation, the organization that controls the stratokey.com domain must be issued SSL certificates to allow secure access by any browser.

The options for the organization are to obtain a certificate for every combination of subdomain that could be used or obtain a "wildcard certificate", which is one that allows any value, but only for the first subdomain component in a URL.

Examples recognize that these options may not be feasible for an organization, as the subdomains in use are not under the control of the organization, and additional subdomains could be added by the application provider at any point in time.

When structuring is performed by the suffix proxy, some examples provide that the '.' characters are replaced in the entire original URL with replacement characters. As described with other examples, the replacement characters may include "-" so that the preceding example becomes system-na1-salesforce-com.stratokey.com In this way, the original URL appears as a single subdomain and a wildcard SSL certificate can be issued for *.stratokey.com A user in an organization which utilizes the proxy server system 100 may navigate to system-na1-salesforce-com.stratokey.com and the suffix proxy server will communicate with the original URL at system.na1.salesforce.com, in a manner that is seamless to the user.

In some variations, the proxy server system 100 can also operate in modes where the entire subdomain portion of a URL for a third-party network service is pre-mapped to a shortened packed subdomain. For example system.na1.salesforce.com may be mapped internally to "sysna1ns" which is then translated at the proxy server into "system.na1.salesforce.com". In such variations, the proxy server system 100 may perform such processes dynamically at the proxy server level without requiring any client side script injection.

The suffix proxy structuring also supports translating subdomain levels into both paths and query strings of a URL. For example the URL "system.na1.salesforce.com" can be translated into "example.com/system-na1-salesforce-com/" or "example.com?p=system-na1-salesforce-com".

Figure 3:
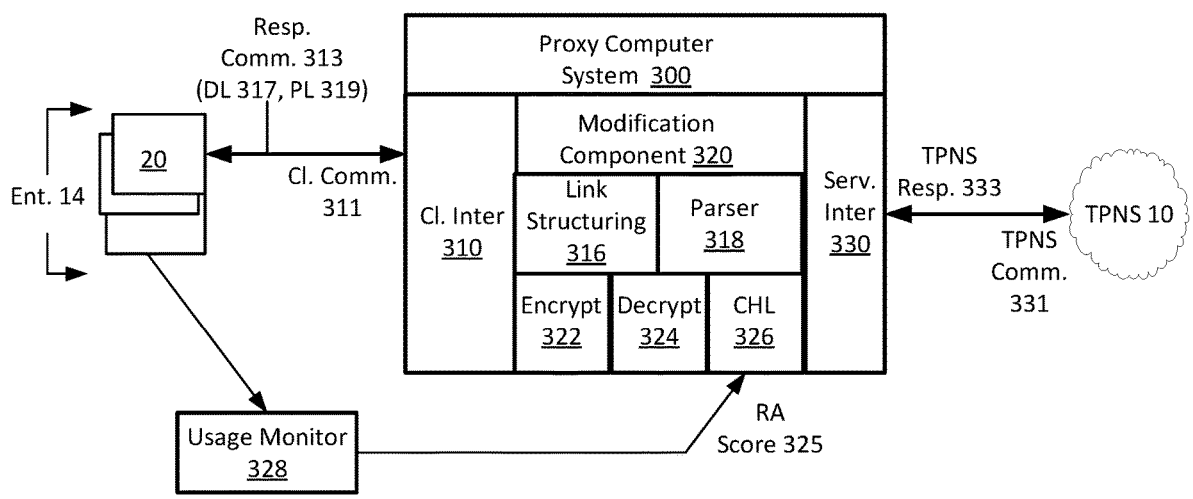
FIG. 3 illustrates a proxy server system that implements content control with respect to access by client computers of a third-party network service.

FIG. 3 illustrates a proxy computer system that implements content control with respect to access by client computers of a third-party network service. In particular, a proxy computer system 300 may be implemented using a server, or combination of servers, to receive and forward communications between the group of client computers 20 (e.g., operating as part of the enterprise network 14) and the TPNS 10. Each of the client computers 20 may correspond to, for example, an end user terminal, work station or other computer system capable of communicating with the proxy computer system 300 over the World Wide Web and/or other data networks.

According to some examples, the system 300 includes a client interface 310, a communication modification component 320 and a service interface 330. The client interface 310 can provide for the exchange of proxy communications with individual client computers 20 of the enterprise group. The modification component 320 may modify outgoing communications (e.g., client communications 311) that originate from client computers 20 and are intended for the TPNS 10, as well incoming communications (e.g., TPNS response 333) that originate from the TPNS 10 in response to the requests of the respective requesting client computers 20.

As described with an example of FIG. 1, the client interface 310 may receive client communications 311 for content from individual client computers 20. In some implementations, the client communication 311 includes, for example, request links 111 (see FIG. 1) and/or session links 115 (see FIG. 1), such as described with an example of FIG. 1. In some variations, the client communications 311 can include or otherwise specify data and content submissions, such as field data and/or attachments (e.g., documents or other files).

The modification component 320 includes components to modify client communications 311 that are received by the system 300 and are intended for the TPNS 10, as well as TPNS responses 333 that are received by the system 300 from the TPNS 10 and are intended for a corresponding requesting client computer 20. In an example, the modification component 320 includes one or more types of link structuring logic 316 to restructure links provided with the TPNS response 333, for the requesting client computer 20. For example, the link structuring logic 316 may be implemented as described with an example of FIG. 1 (e.g., see link structuring logic 120), to unpack request links 111 (FIG. 1) and/or session links 115 (FIG. 1), such that client communications 311 can be received and restructured by the system 300 for communication to the TPNS 10. Thus, as described with examples of FIG. 1, the link structuring logic 316 may restructure links of client communications 311 and of TPNS responses 333, in order to reduce or otherwise mitigate a need for certificates by the respective client computers 20.

As an addition or variation, the modification component 320 may include encryption logic 322 and decryption logic 324. The encryption logic 322 can layer-in encryption of data that is included or otherwise provided with client communications 311. By way of example, the client communications 311 can include field data and/or file attachments, which the encryption logic 322 may encrypt in real-time, before the service interface 330 sends corresponding TPNS communications 331 to the TPNS 10. In some examples, the system 300 handles all client communications 311 originating from the client computers 20 to the TPNS 10. Thus, the system 300 can provide an enterprise 14 of clients 20 with an additional enhancement of encrypting data fields, attachments, and other information included with the client communications 311.

Still further, in some examples, the system 300 selectively encrypts data of client communications 311 before sending modified communications 331 to the TPNS 10. For example, the modification component 320 may be preconfigured to recognize certain data fields and types or classifications of data items as being sensitive. Based on such determinations, the encryption logic 322 can selectively encrypt such data fields, types or classifications, such that the TPNS 10 receives TPNS communications 331 that include encrypted data originating from the client computers 20.

The service interface 330 can send the TPNS communication 331 to the TPNS 10, and receive corresponding TPNS responses 333 from the TPNS 10. As described with an example of FIG. 1, the TPNS response 333 may include, for example, restructured links 121 (see FIG. 1) and session links 125 (see FIG. 1) which are unpacked and otherwise converted into a native format of the TPNS 10. The TPNS response 333 may also be encrypted in whole or in part. In an example, the TPNS response 333 may include content which was subject to encryption by the encryption logic 322.

As described in greater detail, the modification component 320 may alter or otherwise modify the TPNS responses 333. For example, as described with an example of FIG. 1, the link structuring logic 316 may pack session links 125 (see FIG. 1) provided with the response from the TPNS 10, as described with an example of FIG. 1 (e.g., see link structuring logic 120). By unpacking links embedded in communications 311 from individual client computers 20, and packing links provided with 333 to send to respective client computers 20 as response communications 313, the system 300 can utilize wildcard designations as between client computers 20 and the system 300 in order to reduce the number of certificates which individual client computers would otherwise need to communicate with and receive services from the TPNS 10.

In some examples, the decryption logic 324 of the modification component 320 can decrypt encrypted portions of the TPNS response 333. For example, the decryption logic 324 can process each TPNS response 333 of the TPNS 10 to decrypt content which was previously encrypted by the encryption logic 322. As an addition or variation, the decryption logic 324 may decrypt content that was encrypted by the TPNS 10 or another source.

According to some examples, the modification component 320 includes a parsing component 318 to parse the content of the TPNS response 333 to identify sensitive content elements, or portions thereof. The parser 318 may scan the content of the TPNS response 333 for one or more markers that are indicative of elements or portions of the return content being sensitive. In an example, the parser 318 can detect encrypted portions within the content of the TPNS response 333. In variations, the parser 318 may detect other markers associated with sensitive or protected content, with respect to data elements that are embedded within the content of the TPNS response 333. For example, the parser 318 may recognize certain fields of a form that is returned as part of the TPNS response 333 as inherently containing sensitive data or information, even when other fields of the form are not recognized as being sensitive. When the parser 318 identifies a portion of the content of the TPNS response 333 to include sensitive portions or elements, the modification component 320 may implement content handling logic 326 to determine how the sensitive portions or elements are to be provided to the requesting client computer 20.

In an example, the content of the TPNS response 333 includes one or more encrypted portions (e.g., data fields). The modification component 320 parses the content of the TPNS response 333 to identify encrypted data. When a portion of the TPNS response 333 is identified to be encrypted, the modification component 320 utilizes the content handling logic 326 to decrypt the selected encrypted portions of the content.

In some variations, the content handling logic 326 determines an action, or a series of actions which are to be performed with respect to content of the TPNS response 333. In some implementations, the content handling logic 326 can provide for a default set of actions (e.g., decrypt encrypted data elements), as well as one or more alternative set of actions if a predetermined condition or criterion (or set of criteria) are met.

With respect to the examples provided, the content handling logic 326 may include rules or other logic which determine the handling of the sensitive data based at least in part on (i) a type, classification, or other categorization of the data elements included with the TPNS response 333, and/or (ii) a risk assessment of the requesting client (or client that generated the client communication 311, to receive the corresponding TPNS responses 333). In examples in which the content of the TPNS response 333 includes sensitive or encrypted portions, the modification component 320 may implement the content handling logic 326 to determine whether the response communication 313 to the requesting client is to follow a default process or an alternative process. The risk assessment profile may be in the form of a score, or as one or more predefined quantifiable metrics that are deemed relevant to evaluating unwanted risks which may be associated with a requesting client, such as (i) the requesting client 20 (or its user) being unauthorized to receive the sensitive data, (ii) the requesting client 20 (or its user) being an imposter, and/or (iii) the requesting client 20 being unprotected or otherwise having poor security integrity.

According to some examples, the modification component 320 utilizes a usage monitor 328 to determine information relating to a usage profile associated with individual client computers 20. The usage monitor 328 may execute on the system 300 to aggregate and statistically analyze proxy-based data that is indicative of user behavioral traits, such as (i) access times during the course of a typical day during which the client and/or the user of the client accesses the proxy computer system 300 and/or the TPNS 10; (ii) data usage of the client computer 20 and/or the associated user of the client, with respect to the system 300 and/or the TPNS 10; and/or (iii) network locations, devices or physical locations where the client computer 20 and/or associated user accessed the system 300 and/or the TPNS 10. In variations, the usage monitor 328 may be implemented as a separate component or service of another third-party, or of an enterprise network 14 of the client computers 20. Still further, in variations, the usage monitor 328 can be implemented at least in part by a client application, program, plug-in or process. Still further, the modification component 320 may utilize multiple usage monitors, such as a combination of a local or client base monitor that detects certain types of uses activity, and a network-based usage monitor that detects other types of activity. Additionally, the usage monitor 328 may retrieve usage information from multiple sources, such as from the browser history of individual client computers 20.

In some variations, the modification component 320 implements the usage monitor 328 to obtain a risk assessment score 325 (or other metric) that quantifies a probability of an unwanted risk with respect to the requesting client. Depending on the type of data being accessed and implementation, the usage monitor 328 may generate the risk assessment score 325 as a real-time metric, based on current or very recent usage profile information about the requesting client 20, or its associated user. The content handling logic 326 can select an action (or series of actions) that the system 300 is to perform with respect to the sensitive content element, based at least in part on the risk assessment score 325. As an addition or variation, the content handling logic 326 can select the action or series of actions based on a type, classification or other characteristic of the content portions of the TPNS response 333.

For content provided with the TPNS response 333 for a given transaction, the content handling logic 326 may implement the default process if the risk assessment score 325, which may be determined for the requesting client computer 20, indicates a risk level that is below a given threshold. Likewise, the content handling logic 326 may implement the alternative process if the risk assessment 325 score indicates the risk level for the requesting client computer 20 is above the given threshold. Under the default process, the modification component 320 may utilize the decryption logic 324 to decrypt the encrypted portions of the TPNS response 333. The client interface 310 may then send the response communication 313 to the requesting client 320, with content data that has been decrypted. Under the alternative process, the modification component 320 may send a response communication 313 to the requesting client without decrypting the encrypted data elements or portions. As an alternative or variation, the modification component 320 may remove or otherwise mask (e.g., replace the encrypted content with filler content) the sensitive or encrypted portions of the response communication, so that the requesting client 20 does not have access to even an encrypted form of the sensitive content.

In some variations, multiple threshold levels may be utilized with respect to the risk assessment score 325, and the modification component 320 may select inaction, or one or more series of actions based on the particular risk level of the client computer 20. For example, in a variation, if the risk assessment score 325 of the requesting client 20 indicates a risk level that is below a first threshold that is deemed safe, but above a second threshold that is deemed as likely to be compromised, the requesting client 20 may receive the response communication 313 with sensitive data elements being encrypted. In such an example, a user of the client computer 20 may have ability to decrypt the encrypted data elements using, for example, a previously stored key, or through an additional authentication process. If however, the risk assessment score 325 of the requesting client 20 indicates a risk level that is indicative of the client computer likely being compromised, the modification component 320 may provide the response communication 313 with the sensitive data elements being removed entirely.

Still further, in some examples, the parser 318 may parse the content of the TPNS response 333 in order to determine links to target resources which are otherwise suitable for direct access by the requesting client 20. The link structuring logic 316 may include logic to structure (or restructure) such identified links as direct links 317 that are selectable on the client computer 20 to directly access the respective target resource (e.g., page, form, etc.). By direct access, a client request from the requesting client computer 20 can select the direct link 317 to accesses the target resource through the TPNS 10 (or other network service), and without use of the system 300.

In some examples, the parser 318 of the modification component 320 parses the target resource of the TPNS response 333 to identify content elements which are of a particular type or classification. For example, the parser 318 may identify, from the content of the TPNS response 333, links which locate content elements of one or more predetermined types (e.g., Cascading Style Sheets (CSS), JavaScript or other scripts, image resources, etc.). The parser 318 may detect such content based on, for example, the extension accompanying the file name of individual links in the TPNS response 333.

Upon the parser 318 detecting such links, the link structuring logic 316 embeds a direct link 317 to the target resource within the response communication 313. Conversely, for other types of target resources (e.g., HTML/XHTML), the link structuring logic 316 may generate proxy links 319, such as packed session links (e.g., packed session links 115, in FIG. 1).

The modification component 320 may generate the response communication 313 to include, for example, direct links 317, along with proxy links 319. If the requesting client 20 subsequently selects the direct link 317, the requesting client 20 may access the corresponding target resource on the TPNS 10 directly, without passing the request through the system 300. If, on the other hand, the requesting client 20 selects the proxy link 319 from the response communication 313, the subsequent client communication 311 is directed to the system 300.

In some examples, the modification component 320 can utilize the content handling logic 326 to determine whether a link to a target resource of a predetermined type or classification is to be structured as a direct link 317 with the response communication 313. The content handling logic 326 can implement a dynamic determination based on, for example, the load on the system 300. In such an implementation, the system 300 may increase the number of data types or classifications which can be handled through direct links, such that a greater number of direct links are used when there is more load (e.g., traffic) on the system.

As an addition or alternative, when candidate direct links 317 are found in the TPNS response 333, the content handling logic 326 may probe the target resources that are located by such direct links 317 for suitability, such as to determine whether the respective target resources are available, and not characteristic of content that is sensitive. For a given candidate direct link, if the target resource is not available, or otherwise deemed to be sensitive, the content handling logic 326 may cause the link structuring component 316 to generate a proxy link 319 for the target content. If the client 20 subsequently requests the proxy link 319, the resulting client communication 311 passes through the system 300, where, for example, the target resource can be encrypted.

By way of example, the TPNS response 333 may include:
<script type="javascript" src="/etc/clientlibs/granite/jquery.min.js"/>

If the content handling logic 326 implements a mode to enable direct links, then the link structuring component 316 may generate the following link for inclusion in the response communication 313:
<script type="javascript" src="https://salesforce.com/etc/clientlibs/granite/jquery.min.js"/>

If the content handling logic 326 implements a mode to disable the direct links 317, then the link structuring component 316 may generate the following packed link for inclusion in the response communication 313:
<script type="javascript" src="https://www.example.com/salesforce-com/etc/clientlibs/granite/jquery.min.js"/>

Figure 4:
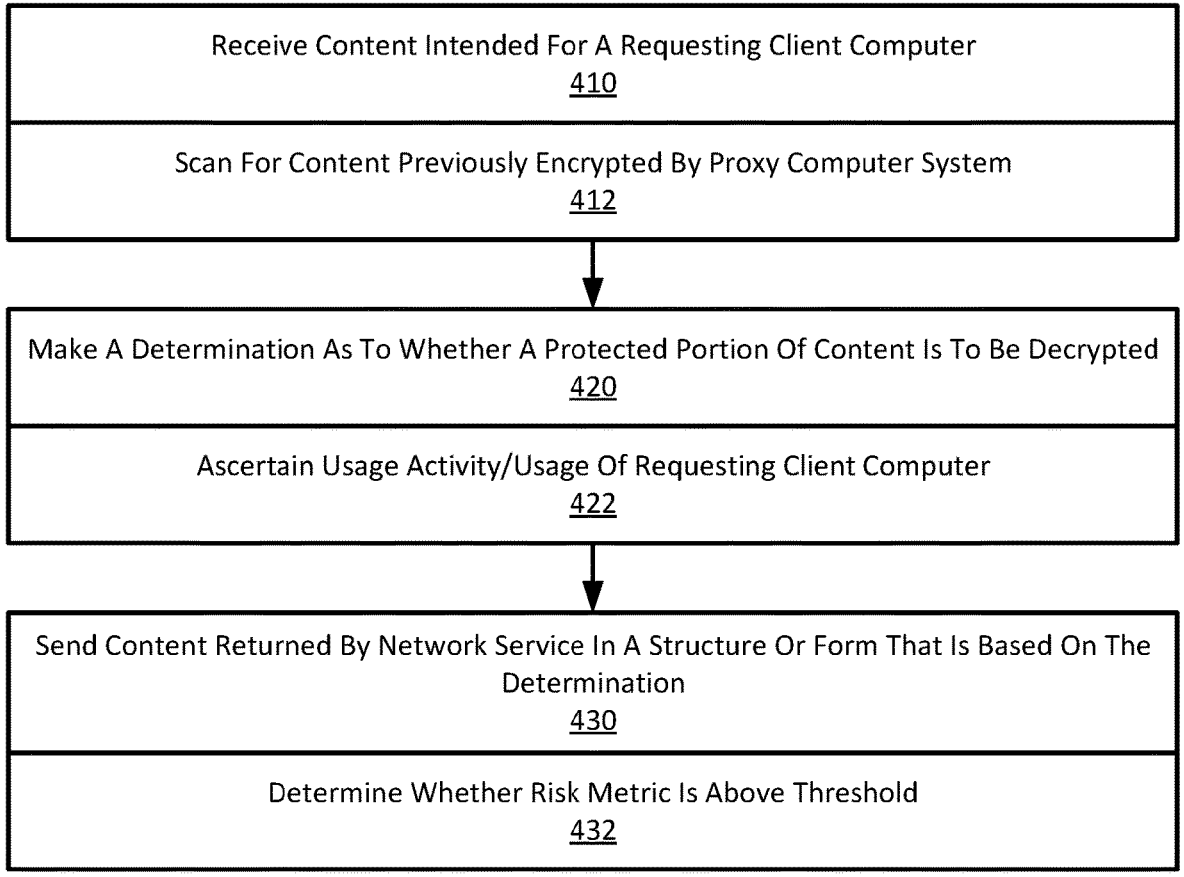
FIG. 4 illustrates an example method for operating a proxy service to selectively decrypt content returned by a third-party network service.
Figure 5:
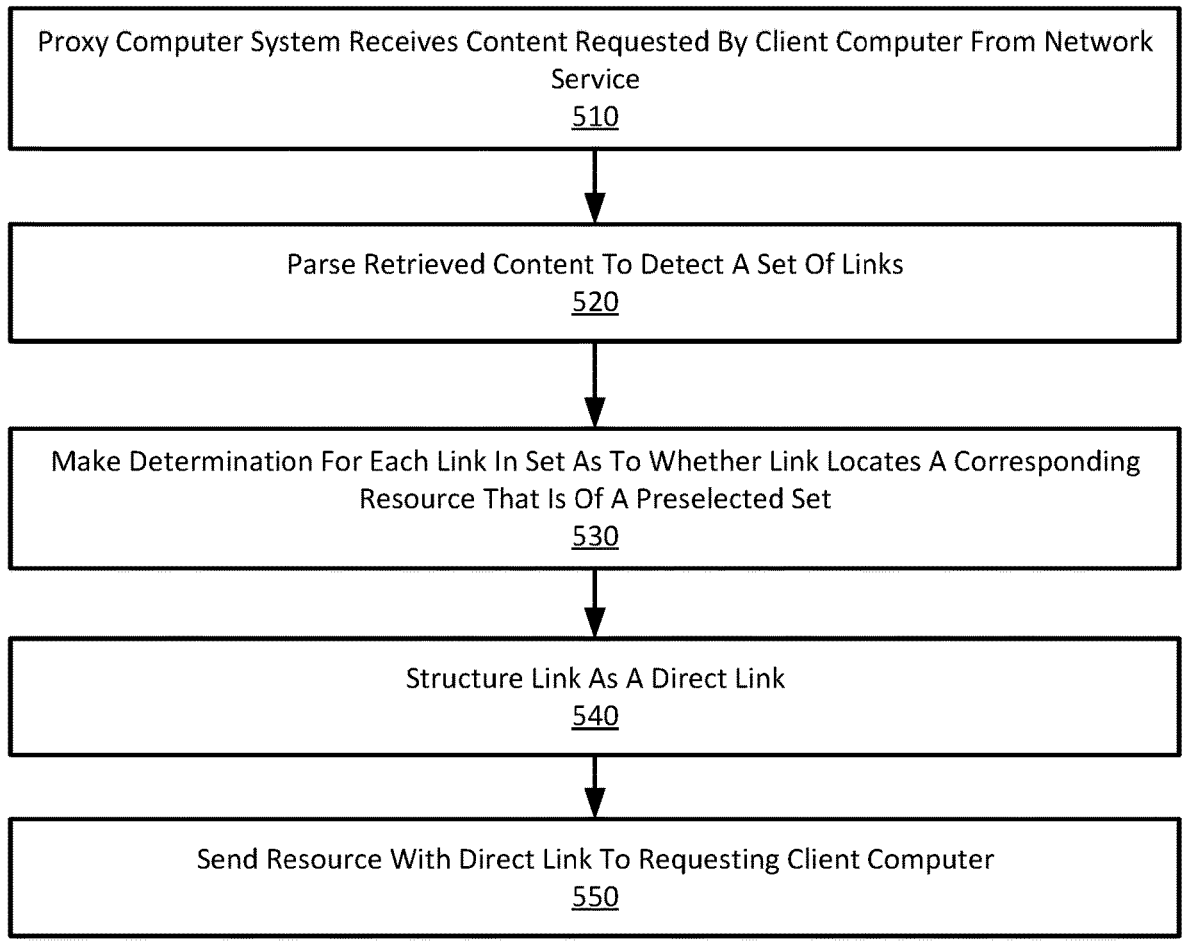
FIG. 5 illustrates an example method for operating a proxy service to selectively provide direct links for client computers to bypass the proxy service.

FIG. 4 illustrates an example method for operating a proxy service to selectively decrypt content returned by a third-party network service. FIG. 5 illustrates an example method for operating a proxy service to selectively provide direct links for client computers to bypass the proxy service.

Example methods such as described with FIG. 4 or FIG. 5 may be implemented using, for example, a proxy service system such as described with an example of FIG. 3. Accordingly, reference may be made to elements of FIG. 3 for purpose of illustrating suitable components for performing a step or sub-step being described.

With reference to FIG. 4, the system 300 receives content intended for a requesting client computer from the TPNS 10 (410). The content may include a sensitive portion, such as a protected (e.g., encrypted) set of data elements. In some examples, the system 300 scans content returned by the TPNS 10 for data elements or portions which were previously encrypted by the system 300, when such content was sent by a corresponding client computer 20 to the system 300 for forwarding to the TPNS 10 (412).

The system 300 makes a determination as to whether a protected portion of content provided by the TPNS 10 is to be decrypted for a requesting client computer 20 (420). The activity or usage of the requesting client computer may be ascertained.

The system 300 may send the content returned by the TPNS 10 to the requesting computer in a structure or form that is based on the determination (430). For example, the determination may be based at least in part on determining whether a risk metric associated with the user's current or past activity exceeds a predetermined threshold (432). If the risk metric indicates a risk level that exceeds the predetermined threshold level, the system 300 may send the content returned by the TPNS 10 in encrypted form, or alternatively, in masked form (e.g., content is removed or replaced by other non-sensitive content). If, on the other hand, the risk metric indicates a risk level that is less than the predetermined threshold level, the system 300 may decrypt the content returned by the TPNS 10, and then send the decrypted content returned by the TPNS 10 to the requesting client computer 20.

With reference to FIG. 5, the system 300 retrieves content requested by a client computer from the TPNS 10 (510). The system 300 parses the retrieved content to detect a set of links (520).

For each link in the set, a determination is made as to whether the link locates a corresponding resource that is of a preselected set of one or more types (530). For example, the system 300 may scan the retrieved content to identify resources which have markers that are indicative of select data types, such as extensions corresponding to scripts (or script files) (e.g., 'js'), as well as 'ccs' files or image files.

If the corresponding resource located by the link is of the preselected type, the system 300 structures the link as a direct link that is selectable by the requesting client computer 20 to bypass the proxy service and to directly retrieve the corresponding resource (540).

The system 300 may provide the client computer with resource that is based on content retrieved from the TPNS 10, and which includes the direct link that locates the corresponding resource of the preselected set (550).

Hardware Diagrams

Figure 6:
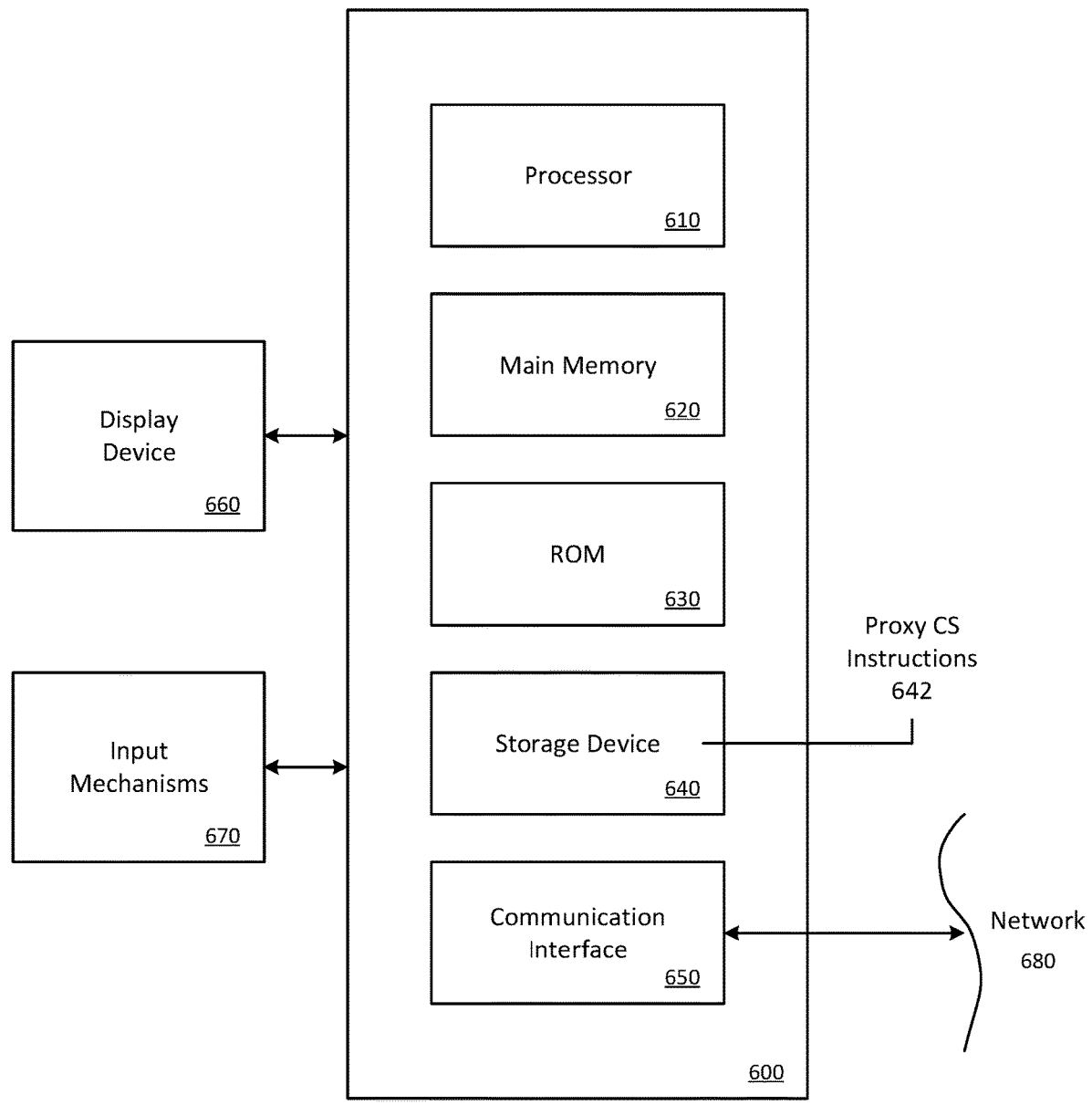
FIG. 6 is a block diagram that illustrates a computer system upon which embodiments described herein may be implemented.

FIG. 6 is a block diagram that illustrates a computer system upon which embodiments described herein may be implemented. For example, in the context of FIG. 1 and FIG. 3, the respective proxy computer system 100, 300 may be implemented using a computer system such as described by FIG. 6. The proxy computer systems 100, 300 may also be implemented using a combination of multiple computer systems as described by FIG. 6.

In one implementation, a computer system 600 includes processing resources 610, a main memory 620, a read only memory (ROM) 630, a storage device 640, and a communication interface 650. The computer system 600 includes at least one processor 610 for processing information and the main memory 620, such as a random access memory (RAM) or other dynamic storage device, for storing information and instructions to be executed by the processor 610. The main memory 620 also may be used for storing temporary variables or other intermediate information during execution of instructions to be executed by the processor 610. The computer system 600 may also include the ROM 630 or other static storage device for storing static information and instructions for the processor 610. A storage device 640, such as a magnetic disk or optical disk, is provided for storing information and instructions, including instructions 642 for implementing the example proxy computer systems 100 and 300. Additionally, the processor 610 can execute the instructions 642 to implement methods such as described with examples of FIGS. 2, 4 and 5.

The communication interface 650 can enable the computer system 600 to communicate with one or more networks 680 (e.g., cellular network) through use of the network link (wireless or wireline). Using the network link, the computer system 600 can communicate with, for example, client computers 20, servers and one or more third-party network services The computer system 600 can also include a display device 660, such as an LCD monitor, or a television set, for example, for displaying graphics and information to a user, or no display device at all as with some servers. One or more input mechanisms 670, such as a keyboard that includes alphanumeric keys and other keys, can be coupled to the computer system 600 for communicating information and command selections to the processor 610. Other non-limiting, illustrative examples of input mechanisms 670 include a mouse, a trackball, touch-sensitive screen, or cursor direction keys for communicating direction information and command selections to the processor 610 and for controlling cursor movement on the display 660.

Examples described herein are related to the use of the computer system 300 for implementing the techniques described herein. According to one embodiment, those techniques are performed by the computer system 300 in response to the processor 610 executing one or more sequences of one or more instructions contained in the main memory 620. Such instructions may be read into the main memory 620 from another machine-readable medium, such as the storage device 640. Execution of the sequences of instructions contained in the main memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following Claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A server system comprising:
   a memory resource to store:
      a set of instructions;
   one or more processors to access the set of instructions from the memory resource to communicate with each of a client computer and a third-party network service in order to provide a proxy service for the client computer to utilize the third-party network service;
   wherein the one or more processors provide the proxy service by:
      receiving content intended for the client computer from the third-party network service;
      analyzing the content to identify one or more sensitive portions of data in an encrypted format, wherein a remainder of the content is not recognized as being sensitive;
      determining a risk metric for the client computer based at least in part on activity of the client computer;
      upon determining that the risk metric indicates that the client computer is authorized to receive the sensitive portions of data, (i) decrypting the one or more sensitive portions of data, and (ii) sending the content, including the decrypted sensitive portions of data and the remainder of the content, to the client computer; and
      upon determining that the risk metric indicates that the client computer is unauthorized to receive the sensitive portions of data, sending the content, including the sensitive portions of data in the encrypted format and the remainder of the content, to the client computer.

2. The server system of claim 1, wherein the activity from the client computer analyzed to determine the risk metric for the client computer includes one or more past interactions with the proxy service or the third-party network service.

3. The server system of claim 1, wherein the one or more processors determine a security integrity of the client computer and determine the risk metric based at least in part on the determined security integrity of the client computer.

4. The server system of claim 2, wherein the one or more processors determine the risk metric based at least on one or more current activities of a user of the client computer, as detected on the client computer.

5. The server system of claim 1, wherein the one or more processors analyze the activity from the client computer by building a usage profile of a user of the client computer, the usage profile identifying one or more usage parameters corresponding to at least one of (i) prior time intervals when the user accesses the third-party network service or the proxy service, or (ii) information that is indicative of a device, network address or physical location when the user previously accessed the third-party network service or the proxy service.

6. The server system of claim 5, wherein the one or more processors determine the risk metric by comparing one or more usage parameters of a current user session with the usage profile.

7. The server system of claim 1, wherein the one or more processors receive and scan a content submission of a user of the client computer to identify the one or more sensitive portions of data.

8. The server system of claim 7, wherein the one or more processors encrypt the content submission before submitting the content to the third-party network service.

9. The server system of claim 1, wherein the risk metric indicates that the client computer is unauthorized to receive the sensitive portions of data based on determining a security integrity or protection status of the client computer.

10. The server system of claim 1, wherein the one or more sensitive portions of data were previously encrypted by the server system, and analyzing the content to identify the one or more sensitive portions of data includes determining that the one or more sensitive portions of data were previously encrypted by the server system.

11. A method for providing a proxy service between a client computer and a third-party network service, the method being implemented by one or more processors of a network computer system and comprising:
    receiving content intended for the client computer from the third-party network service;
    analyzing the content to identify one or more sensitive portions of data in an encrypted format, wherein a remainder of the content is not recognized as being sensitive;
    determining a risk metric for the client computer based at least in part on activity of the client computer;
    making a determination, based on the risk metric, as to whether the client computer is authorized to receive the sensitive portions of data; and
    sending the content to the client computer, including sending the one or more sensitive portions of data in either encrypted form or decrypted form based on the determination.

12. The method of claim 11, wherein the activity from the client computer analyzed to determine the risk metric for the client computer includes one or more past interactions with the proxy service or the third-party network service.

13. The method of claim 12, wherein analyzing the activity from the client computer includes a comparison of one or more detected current activities of a user of the client computer to the one or more past interactions with the proxy service or third-party network service.

14. The method of claim 11, wherein analyzing the activity from the client computer includes building a usage profile of a user of the client computer, the usage profile identifying one or more usage parameters corresponding to at least one of (i) prior time intervals when the user accesses the third-party network service or the proxy service, or (ii) information that is indicative of a device, network address or physical location when the user previously accessed the third-party network service or the proxy service.

15. The method of claim 11, wherein the risk metric indicates that the client computer is unauthorized to receive the sensitive portions of data based on determining a security integrity or protection status of the client computer.

16. The method of claim 11, wherein the one or more sensitive portions of data were previously encrypted by the network computer system, and analyzing the content to identify the one or more sensitive portions of data includes determining that the one or more sensitive portions of data were previously encrypted by the network computer system.

17. A non-transitory computer-readable medium that stores instructions, which when executed by one or more processors of a computer system, cause the computer system to perform operations that include:
receiving content intended for a client computer from a third-party network service;
analyzing the content to identify one or more sensitive portions of data in an encrypted format, wherein a remainder of the content is not recognized as being sensitive;
determining a risk metric for the client computer based at least in part on activity of the client computer;
upon determining that the risk metric indicates that the client computer is authorized to receive the sensitive portions of data, (i) decrypting the one or more sensitive portions of data, and (ii) sending the content, including the decrypted sensitive portions of data and the remainder of the content, to the client computer; and
upon determining that the risk metric indicates that the client computer is unauthorized to receive the sensitive portions of data, sending the content, including the sensitive portions of data in the encrypted format and the remainder of the content, to the client computer.

18. The non-transitory computer-readable medium of claim 17, wherein the activity from the client computer analyzed to determine the risk metric for the client computer includes one or more past interactions with the computer system or the third-party network service.

19. The non-transitory computer-readable medium of claim 17, wherein the risk metric indicates that the client computer is unauthorized to receive the sensitive portions of data based on determining a security integrity or protection status of the client computer.

20. The non-transitory computer-readable medium of claim 17, wherein the one or more sensitive portions of data were previously encrypted by the computer system, and analyzing the content to identify the one or more sensitive portions of data includes determining that the one or more sensitive portions of data were previously encrypted by the computer system.

* * * * *